(12) United States Patent
Gandhi

(10) Patent No.: US 11,526,464 B2
(45) Date of Patent: Dec. 13, 2022

(54) SCALING HDFS FOR HIVE

(71) Applicant: Dropbox, Inc., San Francisco, CA (US)

(72) Inventor: Ashish Gandhi, San Francisco, CA (US)

(73) Assignee: DROPBOX, INC., San Francisco, CA (US)

(*) Notice: Subject to any disclaimer, the term of this patent is extended or adjusted under 35 U.S.C. 154(b) by 502 days.

(21) Appl. No.: 16/369,582

(22) Filed: Mar. 29, 2019

(65) Prior Publication Data
US 2020/0201813 A1    Jun. 25, 2020

Related U.S. Application Data

(60) Provisional application No. 62/783,684, filed on Dec. 21, 2018.

(51) Int. Cl.
*G06F 16/11* (2019.01)
*G06F 16/14* (2019.01)
*G06F 16/182* (2019.01)

(52) U.S. Cl.
CPC .......... *G06F 16/122* (2019.01); *G06F 16/148* (2019.01); *G06F 16/182* (2019.01)

(58) Field of Classification Search
CPC .... G06F 16/122; G06F 16/148; G06F 16/182; G06F 16/1858
See application file for complete search history.

(56) References Cited

U.S. PATENT DOCUMENTS

| | | | | |
|---|---|---|---|---|
| 10,348,810 B1* | 7/2019 | Florissi | ............... | H04L 67/2833 |
| 2014/0229422 A1* | 8/2014 | Jain | ........................ | G06F 16/21 |
| | | | | 707/600 |
| 2015/0310082 A1* | 10/2015 | Han | ...................... | G06F 16/283 |
| | | | | 707/602 |
| 2016/0188426 A1* | 6/2016 | Kousha | ................. | G06F 16/182 |
| | | | | 714/4.12 |
| 2019/0340374 A1* | 11/2019 | Gupta | ..................... | G06F 3/067 |

OTHER PUBLICATIONS

F. Azzedin, "Towards a scalable HDFS architecture," 2013 International Conference on Collaboration Technologies and Systems (CTS), 2013, pp. 155-161, doi: 10.1109/CTS.2013.6567222. (Year: 2013).*

* cited by examiner

*Primary Examiner* — Mark D Featherstone
*Assistant Examiner* — Samuel C Sharpless, III
(74) *Attorney, Agent, or Firm* — Fenwick & West LLP

(57) ABSTRACT

A non-transitory computer-readable storage media storing program instructions which, when executed by one or more processors, cause the one or more processors to perform: receiving a query to the distributed file system; determining a particular partition, associated with the data warehouse system, targeted by the query; accessing a repository associated with the data warehouse system to determine whether a partition-to-cluster mapping entry for the particular partition targeted by the query exists in the repository; in response to a determination that the entry for the particular partition exists in the repository, obtaining, from the entry for the particular partition, an identifier of a particular cluster to which the particular partition is assigned by the entry for the particular partition, the particular cluster being one of a plurality of clusters of the distributed file system, each cluster of the plurality of clusters having one name node and a plurality of data nodes.

18 Claims, 4 Drawing Sheets

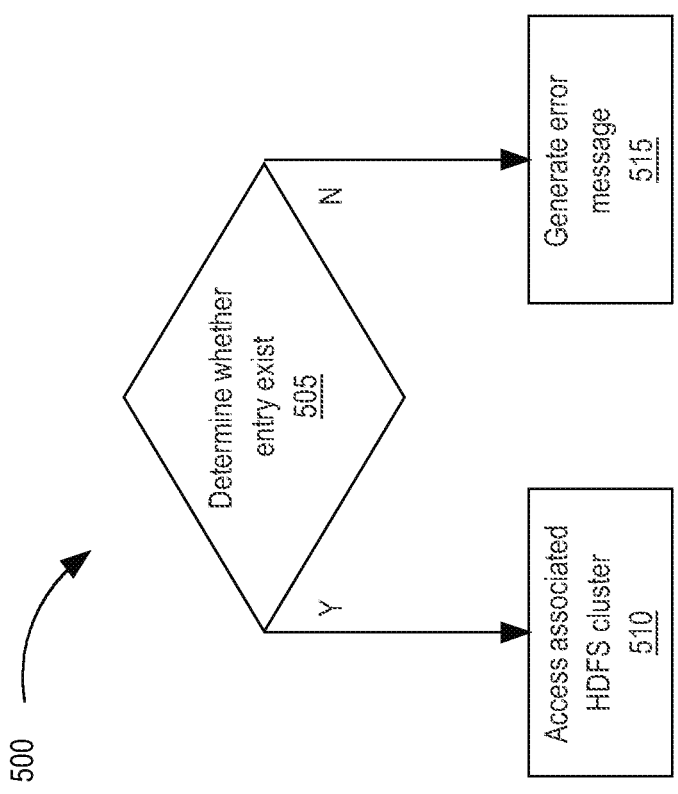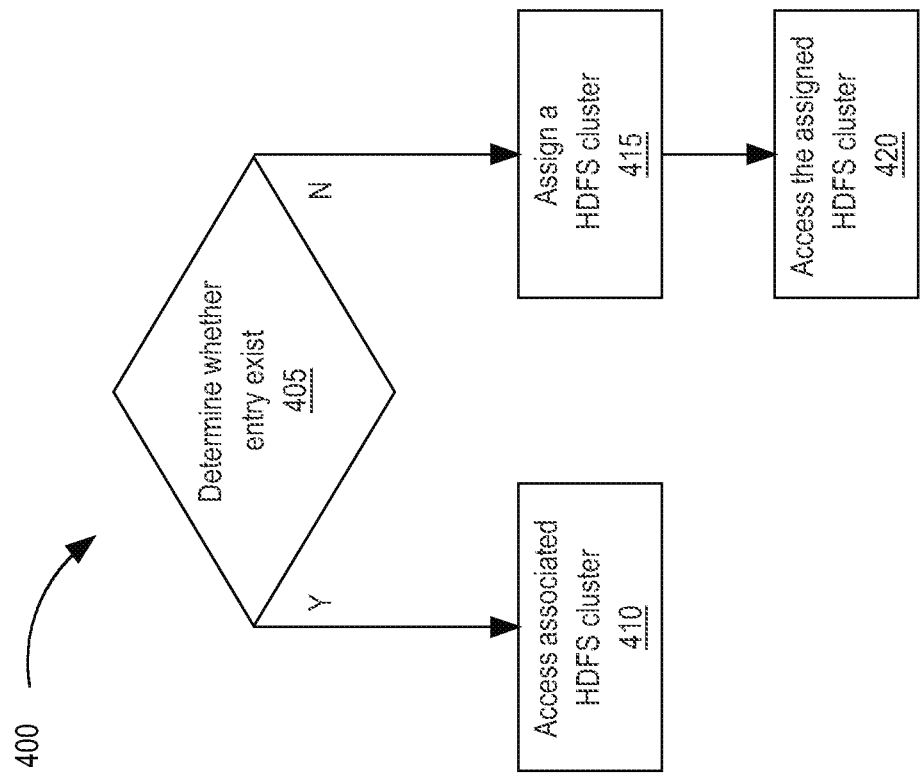

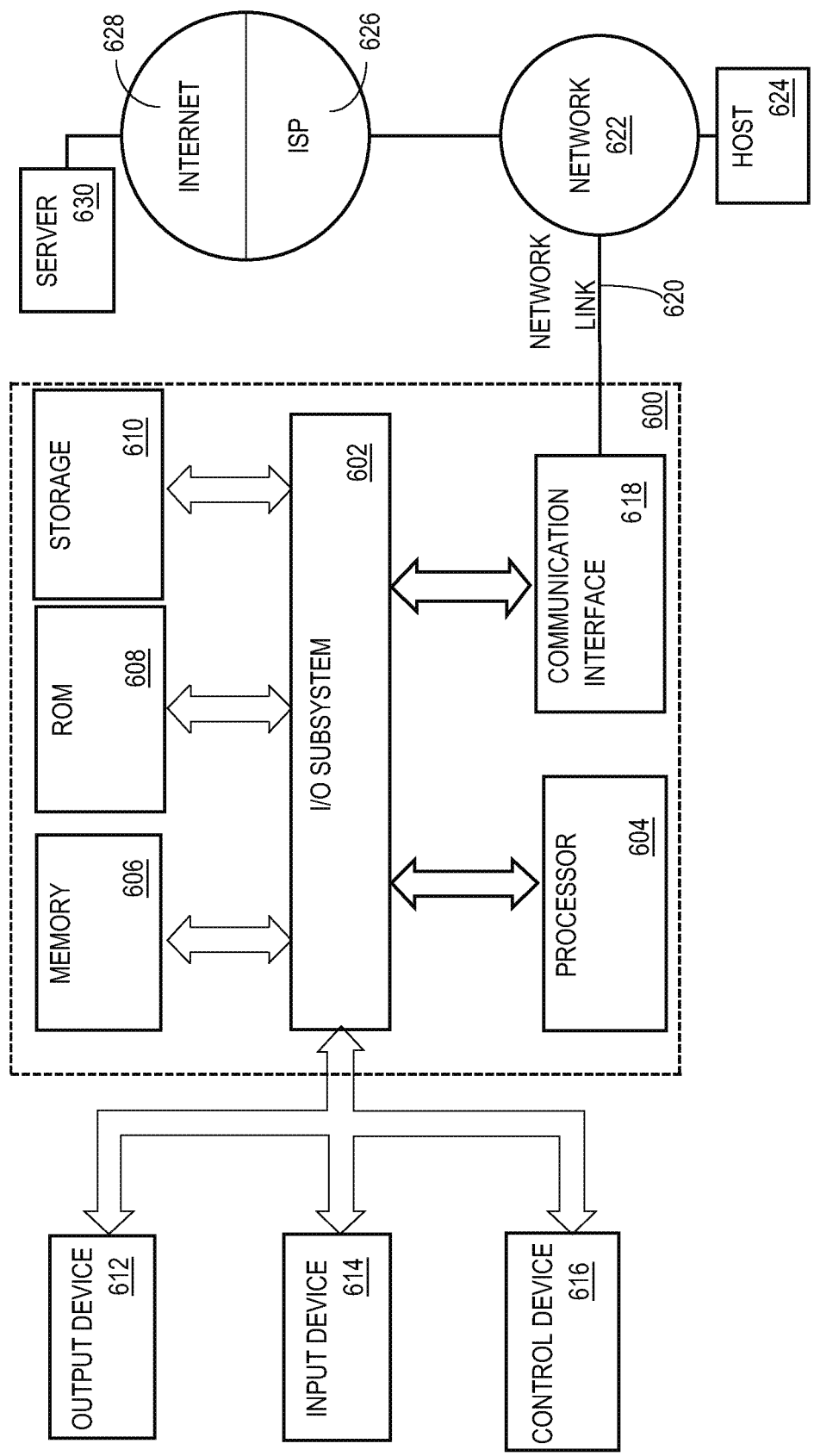

SCALING HDFS FOR HIVE

BENEFIT CLAIM

This application claims the benefit under 35 U.S.C. 119(e) of provisional application 62/783,684, filed Dec. 21, 2018, the entire contents of which are hereby incorporated by reference as if fully set forth herein.

TECHNICAL FIELD

The present application relates generally to the field of data processing technology and, in particular, to scaling Hadoop Distributed File System (HDFS) for Hive.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Apache Hadoop is an open source software platform that facilitates using a network of many computers to solve problems involving massive amounts of data and computation. Hadoop uses a storage system called HDFS (Hadoop distributed file system) to connect a cluster of commodity machines, referred to as nodes, over which data files are distributed. Regardless of its high storage capacity, HDFS has its limitations. For example, the scalability of a centralized NameNode server stores the entire HDFS namespace in live memory for faster access and, as a result, the storage capacity of the cluster cannot grow beyond the available free memory space on the NameNode. The NameNode server scales based on the number of files while DataNode servers are added based on the size of the data. For example, two 250 MB files are worse for the NameNode server than one 500 MB file. From a DataNode server's perspective, there is not much difference. However, for a growing cluster, increasing number of DataNode servers means increasing workload on the NameNode server, which thereby imposes scalability and performance limits.

Thus, there is a need for an improved approach to enabling scaling and improving performance of HDFS operations while continuing to scale.

SUMMARY

The appended claims may serve as a summary of some implementations of present the invention.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 illustrates a flow diagram of a write process, in an example embodiment.

FIG. 5 illustrates a flow diagram of a read process, in an example embodiment.

FIG. 6 illustrates a block diagram of a computer system with which an embodiment may be implemented.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Apache HDFS: A Brief Introduction

APACHE HDFS (Hadoop Distributed File System) is a distributed, high fault-tolerant file system that provides high-throughput access to application data and is suitable for applications with extremely large data sets, referred to as Big Data. HDFS allows data files to be distributed across nodes, such as personal computers, of a cluster. Data files can be accessed and stored as one seamless file system.

Figure 1:
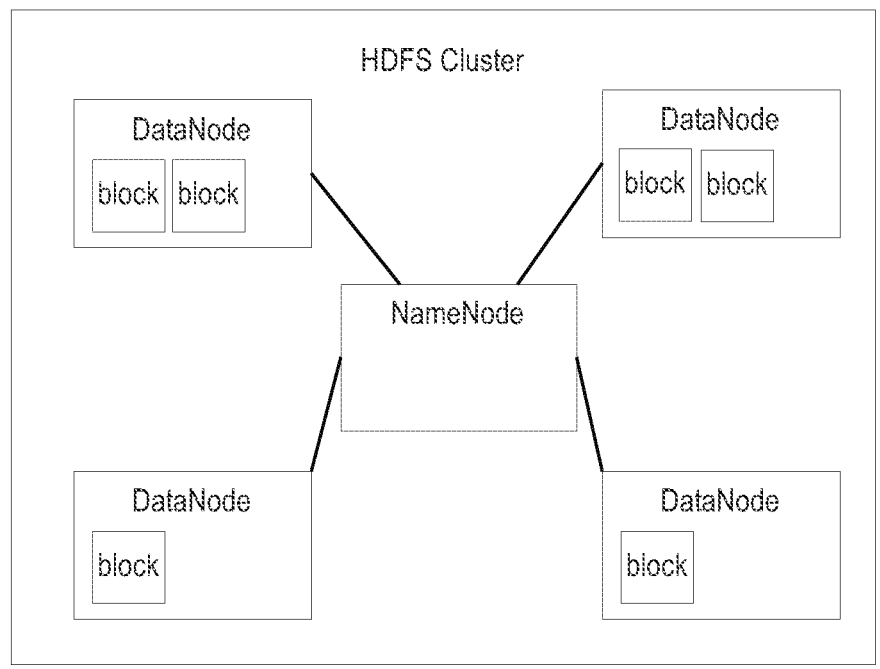
FIG. 1 illustrates a block diagram of a HDFS cluster.

FIG. 1 illustrates a block diagram of a HDFS cluster. A HDFS cluster consists of a single node, called a NameNode, that manages the file system namespace and regulates client access to files. Files are split into blocks, which are stored in a distributed manner across nodes, called DataNodes, of the HDFS cluster.

The NameNode executes file system namespace operations like opening, closing, and renaming files and directories. It also determines the mapping of blocks to the DataNodes and contains metadata of each block/file stored in HDFS. The DataNodes serve read and write requests from the NameNode. They also perform block creation, deletion, and replication upon instruction from the NameNode.

While some implementations involve the HDFS, other implementations involve a different distributed file system. In particular, one skilled in the art will appreciate after reading this disclosure that the techniques disclosed herein for scaling HDFS for Hive can applied to other distributed file systems that uses a centralized name node or other centralized distributed file system metadata store that cannot be scaled horizontally as easily as the distributed nodes of the file system itself. For example, the techniques may be applied to a distributed file system that uses a single active-standby pair of file system metadata/name nodes.

Apache Hive: A Brief Introduction

Apache Hive is a data warehouse infrastructure tool in the Hadoop ecosystem. Hive resides on top of HDFS to define structure for the unstructured Big Data in HDFS. Hive provides SQL like language for querying and analyzing HDFS data. Hive stores schema in the form of metadata, which provides a structure to stored data. Hive data may be categorized into three types on the granular level: table, partition, and bucket. Tables in Hive are the same as tables in a Relational Database. Tables can be organized into partitions for grouping similar types of data together based on a partition key. Each table can have one or more partition keys to identify one or more partitions, which allows for faster query on slices of data. Partitions can be further divided into more manageable parts, referred to as buckets, based on the hash function of a bucketing column in the table. Records that are bucketed by the same column will be saved in the same bucket. It is not necessary for tables to be partitioned or bucketed, but these abstractions allow large quantities of data to be pruned during query processing, resulting in faster query execution. In an embodiment, HDFS files are mapped to Hive tables.

Figure 2:
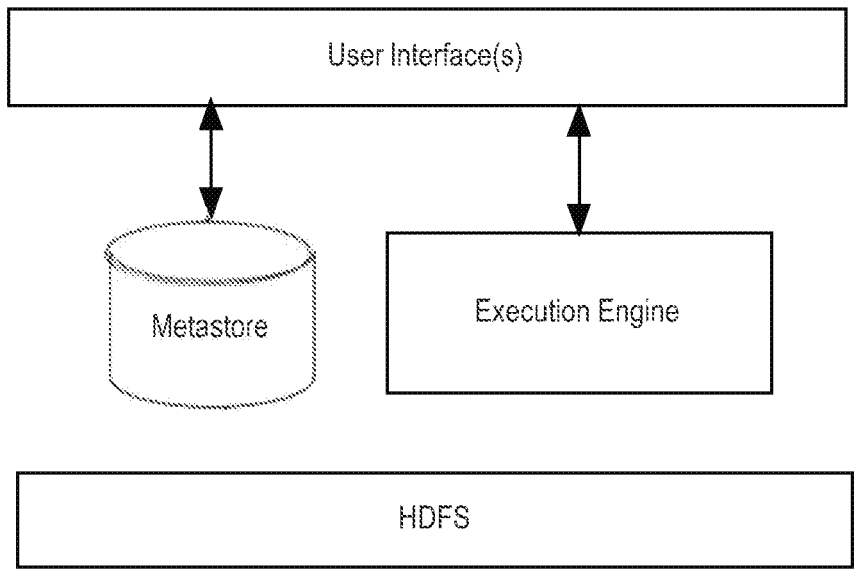
FIG. 2 illustrates a block diagram of Hive.

FIG. 2 illustrates a block diagram of Hive. Hive is a tool for users to interact with HDFS. Illustrated components of Hive in FIG. 2 include a user interface, a metastore, and an execution engine. Other components of Hive are not illustrated for simplicity of illustration. Example user interfaces that Hive supports include Hive Web UI, Hive command line, and Hive HD Insight, for executing queries. The metastore stores all Hive metadata. Hive metadata includes various types of information like structure of tables and the partitions along with the column, column type, serializer and deserializer, which are required for Read/Write operation on HDFS data. The execution engine acts as a bridge between Hive and HDFS to process queries and generate results.

While some implementations involve the Hive data warehouse system that operates on top of a distributed file system like, for example, HDFS, other implementations involve a different data warehouse system that supports an SQL-based query language and that operates on top of a distributed file system. In particular, one skilled in the art will appreciate after reading this disclosure that the techniques disclosed herein for scaling HDFS for Hive can be applied to other data warehouse systems that support an SQL-based query language, operate on top of a distributed file system, and provide data query and analysis functionality for distributed data.

Scaling HDFS for Hive

HDFS was designed as a scalable distributed file system to support thousands of DataNodes within a single cluster. If the cluster's processing power is overwhelmed by growing volumes of data, additional DataNodes can be added to the cluster. However, with the NameNode being the repository for critical HDFS metadata for the cluster, rapid growth of data makes it difficult to HDFS scale reliably when there is too much HDFS metadata for the NameNode to keep track of. It is difficult to scale out the NameNode's responsibility horizontally. With increasing load on the NameNode, the performance and throughput of the NameNode decreases.

To improve scaling and improving performance of HDFS operations, embodiments of the present invention utilize multiple HDFS clusters such that work that previously one NameNode was responsible for may be spread across multiple NameNodes. Data that goes into Hive is written to one of a plurality of HDFS clusters. At query time, data is pulled from across all clusters, working seamlessly with existing analytics systems. In some embodiments, little or no changes in end-user usage or behavior are required.

Figure 3:
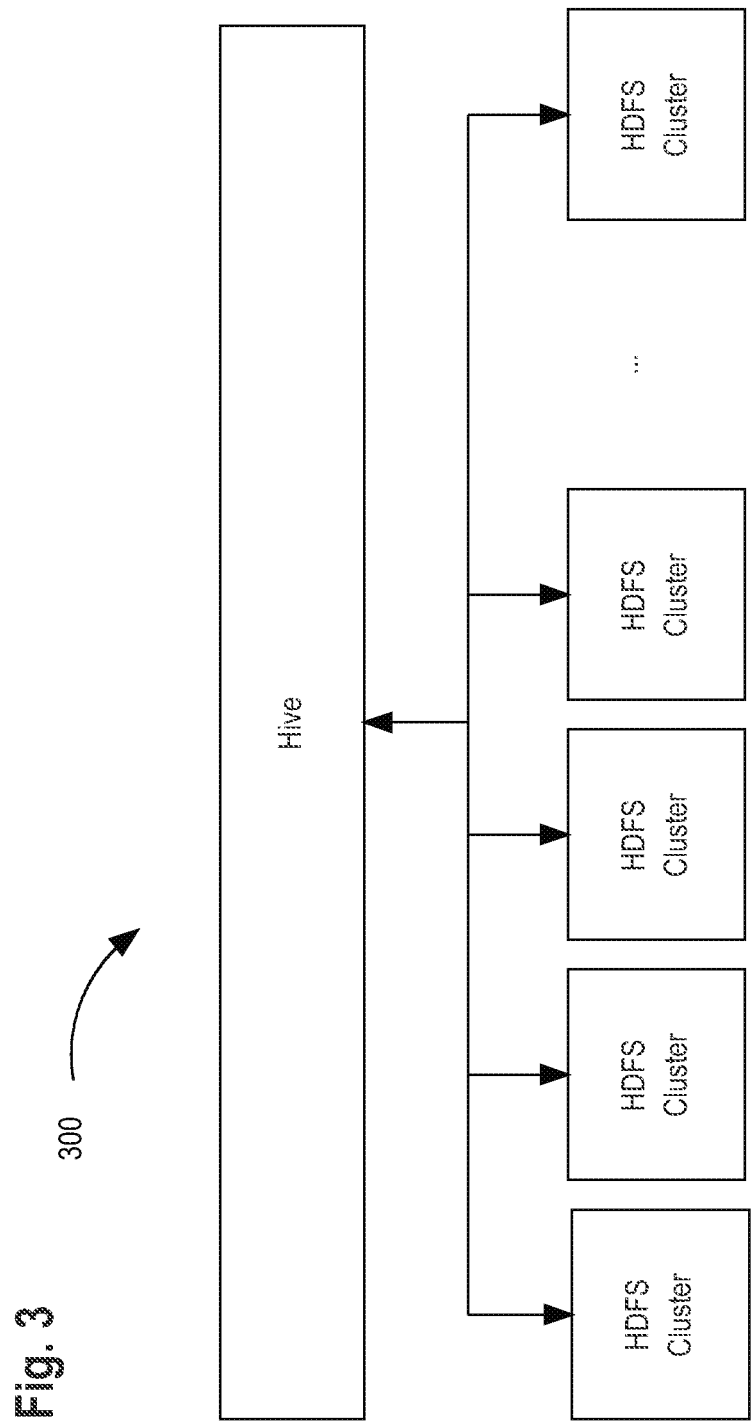
FIG. 3 illustrates a block diagram of a scalable system, in an example embodiment.

FIG. 3 illustrates a block diagram of a scalable system, in an example embodiment. In the example of FIG. 3, the scalable system 300 comprises five (5) HDFS clusters, although more or less may be included, and Hive, which sits on top of the HDFS clusters in the system 300 and is configured as a single interface to data stored in the HDFS clusters. When additional NameNodes are needed, additional HDFS cluster(s) may be easily added to the system and Hive may be configured to also interface with data stored in the additional HDFS cluster(s). Each HDFS clusters may be similarly configured as the HDFS cluster in FIG. 1.

In implementation, Hive is modified such that Hive partitions may be written to different HDFS clusters in a system. Hive partitions may be time-based, size-based, user-based, or a combination thereof, depending on the requirements of the particular implementation at hand. In an embodiment, Hive partitioned by time, such as on the hour, may result in a smaller number of files and faster queries.

Which HDFS cluster to write to may be selected randomly or by a selection scheme. For example, each HDFS cluster may be periodically or continuously monitored and may be assigned a weight based on its utilization level. In an embodiment, a greater weight indicates lesser utilization. An HDFS cluster may be selected because it has the greatest weight or may be selected according to a different selection scheme. In conjunction with the NameNode of the selected HDFS cluster, data associated with the Hive partition are written to the DataNodes of the selected HDFS cluster. A selection scheme based on weights may help load balance the HDFS clusters such that no one HDFS cluster is either over-utilized or under-utilized.

In an embodiment, rather than or in addition to storing metadata mapping Hive tables to HDFS files, metadata mapping Hive partitions to HDFS clusters may be stored in a datastore, such as the metastore in Hive, for subsequent writes and reads. Unique identifiers for the Hive partitions and unique identifiers for the HDFS clusters are used in the mappings. An example partition identifier may be "day=2017-10-05/hour_ts=1507194000" for a table name "photos_activity_server." In an embodiment, unique identifiers of the HDFS clusters may be associated location addresses of the HDFS clusters, such an HDFS cluster URL. An example HDFS cluster URL may be "hdfs://analytics-production-0" or "hdfs://analytics-production-1." In an embodiment, shards may be sequentially and numerically identified as 0, 1, etc.

FIG. 4 illustrates a flow diagram of a write process, in an example embodiment. In the flow diagram 400, at Step 405, using a query received at a Hive user interface, a data store, such as the metastore in Hive, is accessed to determine whether an entry for the Hive partition associated with the query exists in the metastore. Such an entry is sometimes referred to herein as a "partition-to-cluster mapping" entry. In an embodiment, the query may include an identifier associated with the Hive partition. An example query to write data to a partition is "INSERT OVERWRITE TABLE photos_activity_server PARTITION (day="2017-10-05", hour_ts=1507222800) VALUES (1, 1);". If it is determined that an entry for the Hive partition associated with the query does exist in the metastore, then at Step 410, the HDFS cluster associated with the Hive partition is accessed, such as by using its HDFS cluster URL. Data may then be written to the HDFS cluster.

However, if it is determined that an entry for the Hive partition associated with the query does not exist in the metastore, then at Step 415, one of the HDFS clusters is assigned. The assigned HDFS cluster may be selected randomly or by a selection scheme. In an embodiment, the selection scheme may be based on utilization levels of the HDFS clusters. A mapping of the Hive partition to the selected HDFS cluster is stored in the metastore. At Step 420, the selected HDFS cluster is accessed, such as by its HDFS cluster URL. Data may then be written to the HDFS cluster.

FIG. 5 illustrates a flow diagram of a read process, in an example embodiment. In the flow diagram 500, at Step 505, using a query received at a Hive user interface, a data store, such as the metastore in Hive, is accessed to determine whether an entry for the Hive partition associated with the query exists in the metastore. An example query to read data is "SELECT*FROM photos_activity_server WHERE hour_ts>=1507222800;". If it is determined that an entry for the Hive partition associated with the query does exist in the metastore, then at Step 510, the HDFS cluster associated with the Hive partition is accessed, such as by using its HDFS cluster URL. Data may then be accessed and returned from the HDFS cluster for display in the user interface for display. However, if it is determined that an entry for the Hive partition associated with the query does not exist in the metastore, then at Step 515, an error notification may be generated for display in the user interface.

Other queries may be received at a Hive user interface. For example, a query to retrieve information on an existing partition, such as "DESCRIBE FORMATTED photos_activity_server PARTITION (day="2017-10-05", hour_ts=1507222800);", may be input at the Hive user interface. The result output would indicate the location information for this partition.

Using the foregoing techniques, the modifications to Hive to communicatively couple with a plurality of HDFS clusters advantageously eliminate namespace limitations of a single NameNode. When memory on a single NameNode is full, storage capacity could not be increased. The NameNode is required to store the namespace in memory to operate. However, as the amount of memory used increases, the NameNode's performance and availability start to deteriorate and the NameNode eventually stops working. With multiple NameNodes, the distribution of namespace is advantageously distributed across the multiple NameNodes. Implementations thus provide for improved performance and functionality, specifically, in relation to decreasing computing resources (for example, CPU time and memory) and processing time.

Note that while in the foregoing described implementations a partition to which a read or write data request or query is directed determines which distributed file system cluster the request or query should be directed, another targeted aspect of a data request or query may be used to determine the cluster to which to direct the request or query. For example, the cluster to which to direct a request or query may be determined based on the Hive bucket targeted by the request or query.

In addition to, or as an alternative to, directing a request or query to a cluster based on a data schema object (e.g., Hive partition or Hive bucket) targeted by the request or query, a request or query may be directed to a cluster based on the data object targeted by the request or query. For example, a request or query may be directed to a cluster based on an identifier of a data object representing a user of an online service that is referenced in the request or query, or based on a combination of the user identifier and a partition identifier, or based on a combination of the user identifier and a bucket identifier.

Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 6 is a block diagram that illustrates an example computer system with which an embodiment may be implemented. In the example of FIG. 6, a computer system 600 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

The computer system 600 includes an input/output (I/O) subsystem 602 which may include a bus and/or other communication mechanism(s) for communicating information and/or instructions between the components of the computer system 600 over electronic signal paths. The I/O subsystem 602 may include an I/O controller, a memory controller and at least one I/O port. The electronic signal paths are represented schematically in the drawings, for example as lines, unidirectional arrows, or bidirectional arrows.

At least one hardware processor 604 is coupled to the I/O subsystem 602 for processing information and instructions. The hardware processor 604 may include, for example, a general-purpose microprocessor or microcontroller and/or a special-purpose microprocessor such as an embedded system or a graphics processing unit (GPU) or a digital signal processor or ARM processor. The processor 604 may comprise an integrated arithmetic logic unit (ALU) or may be coupled to a separate ALU.

The computer system 600 includes one or more units of memory 606, such as a main memory, which is coupled to the I/O subsystem 602 for electronically digitally storing data and instructions to be executed by the processor 604. The memory 606 may include volatile memory such as various forms of random-access memory (RAM) or other dynamic storage device. The memory 606 also may be used for storing temporary variables or other intermediate information during execution of instructions to be executed by the processor 604. Such instructions, when stored in non-transitory computer-readable storage media accessible to the processor 604, can render the computer system 600 into a special-purpose machine that is customized to perform the operations specified in the instructions.

The computer system 600 further includes non-volatile memory such as read only memory (ROM) 608 or other static storage device coupled to the I/O subsystem 602 for storing information and instructions for the processor 604. The ROM 608 may include various forms of programmable ROM (PROM) such as erasable PROM (EPROM) or electrically erasable PROM (EEPROM). A unit of persistent storage 610 may include various forms of non-volatile RAM (NVRAM), such as FLASH memory, or solid-state storage, magnetic disk or optical disk such as CD-ROM or DVD-ROM and may be coupled to the I/O subsystem 602 for storing information and instructions. The storage 610 is an example of a non-transitory computer-readable medium that may be used to store instructions and data which when executed by the processor 604 cause performing computer-implemented methods to execute the techniques herein.

The instructions in memory 606, ROM 608 or storage 610 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

The computer system 600 may be coupled via the I/O subsystem 602 to at least one output device 612. In one embodiment, the output device 612 is a digital computer display. Examples of a display that may be used in various embodiments include a touch screen display or a light-emitting diode (LED) display or a liquid crystal display (LCD) or an e-paper display. The computer system 600 may include other type(s) of output devices 612, alternatively or in addition to a display device. Examples of other output devices 612 include printers, ticket printers, plotters, projectors, sound cards or video cards, speakers, buzzers or piezoelectric devices or other audible devices, lamps or LED or LCD indicators, haptic devices, actuators or servos.

At least one input device 614 is coupled to the I/O subsystem 602 for communicating signals, data, command selections or gestures to the processor 604. Examples of input devices 614 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 616, which may perform cursor control or other automated control functions such as navigation in a graphical interface on a display screen, alternatively or in addition to input functions. The control device 616 may be a touchpad, a mouse, a trackball, or cursor direction keys for communicating direction information and command selections to the processor 604 and for controlling cursor movement on the display 612. The input device may have at least two degrees of freedom in two axes, a first axis (for example, x) and a second axis (for example, y), that allows the device to specify positions in a plane. Another type of input device is a wired, wireless, or optical control device such as a joystick, wand, console, steering wheel, pedal, gearshift mechanism or other type of control device. The input device 614 may include a combination of multiple different input devices, such as a video camera and a depth sensor.

In another embodiment, the computer system 600 may comprise an internet of things (IoT) device in which one or more of the output device 612, input device 614, and control device 616 are omitted. Or, in such an embodiment, the input device 614 may comprise one or more cameras, motion detectors, thermometers, microphones, seismic detectors, other sensors or detectors, measurement devices or encoders and the output device 612 may comprise a special-purpose display such as a single-line LED or LCD display, one or more indicators, a display panel, a meter, a valve, a solenoid, an actuator or a servo.

When the computer system 600 is a mobile computing device, the input device 614 may comprise a global positioning system (GPS) receiver coupled to a GPS module that is capable of triangulating to a plurality of GPS satellites, determining and generating geo-location or position data such as latitude-longitude values for a geophysical location of the computer system 600. The output device 612 may include hardware, software, firmware and interfaces for generating position reporting packets, notifications, pulse or heartbeat signals, or other recurring data transmissions that specify a position of the computer system 600, alone or in combination with other application-specific data, directed toward host 624 or server 660.

The computer system 600 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by the computer system 600 in response to the processor 604 executing at least one sequence of at least one instruction contained in the main memory 606. Such instructions may be read into the main memory 606 from another storage medium, such as the storage 610. Execution of the sequences of instructions contained in the main memory 606 causes the processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as the storage 610. Volatile media includes dynamic memory, such as the memory 606. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of the I/O subsystem 602. Transmission media can also take the form of acoustic or light waves, such as those generated during radio-wave and infra-red data communications.

Various forms of media may be involved in carrying at least one sequence of at least one instruction to the processor 604 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to the computer system 600 can receive the data on the communication link and convert the data to a format that can be read by the computer system 600. For instance, a receiver such as a radio frequency antenna or an infrared detector can receive the data carried in a wireless or optical signal and appropriate circuitry can provide the data to the I/O subsystem 602 such as place the data on a bus. The I/O subsystem 602 carries the data to the memory 606, from which the processor 604 retrieves and executes the instructions. The instructions received by the memory 606 may optionally be stored on the storage 610 either before or after execution by the processor 604.

The computer system 600 also includes a communication interface 618 coupled to bus 602. The communication interface 618 provides a two-way data communication coupling to network link(s) 620 that are directly or indirectly connected to at least one communication networks, such as a network 622 or a public or private cloud on the Internet. For example, the communication interface 618 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. The network 622 broadly represents a local area network (LAN), wide-area network (WAN), campus network, internetwork or any combination thereof. The communication interface 618 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, the communication interface 618 sends and receives electrical, electromagnetic or optical signals over signal paths that carry digital data streams representing various types of information.

The network link 620 typically provides electrical, electromagnetic, or optical data communication directly or through at least one network to other data devices, using, for example, satellite, cellular, Wi-Fi, or BLUETOOTH technology. For example, the network link 620 may provide a connection through the network 622 to the host computer 624.

Furthermore, the network link 620 may provide a connection through the network 622 or to other computing devices via internetworking devices and/or computers that are operated by an Internet Service Provider (ISP) 626. The ISP 626 provides data communication services through a world-wide packet data communication network represented as the Internet 628. A server computer 630 may be coupled to the Internet 628. The server 630 broadly represents any computer, data center, virtual machine or virtual computing instance with or without a hypervisor, or computer executing a containerized program system such as DOCKER or KUBERNETES. The server 630 may represent an electronic digital service that is implemented using more than one computer or instance and that is accessed and used by transmitting web services requests, uniform resource locator (URL) strings with parameters in HTTP payloads, API calls, app services calls, or other service calls. The computer system 600 and the server 630 may form elements of a distributed computing system that includes other computers, a processing cluster, server farm or other organization of computers that cooperate to perform tasks or execute applications or services. The server 630 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The server 630 may comprise a web application server that hosts a presentation layer, application layer and data storage layer such as a relational database system using structured query language (SQL) or no SQL, an object store, a graph database, a flat file system or other data storage.

The computer system 600 can send messages and receive data and instructions, including program code, through the network(s), the network link 620 and the communication interface 618. In the Internet example, the server 630 might transmit a requested code for an application program through the Internet 628, the ISP 626, the local network 622 and the communication interface 618. The received code may be executed by the processor 604 as it is received, and/or stored in the storage 610, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share the processor 604. While each processor 604 or core of the processor executes a single task at a time, the computer system 600 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

What is claimed is:

1. A computer-implemented method of scaling a distributed file system for a data warehouse system that operates on the distributed file system, the method comprising:
receiving a write request to write data to the distributed file system;
based on the receiving the write request to write data to the distributed file system, determining a first partition, associated with the data warehouse system, targeted by the write request to write data;
wherein at least a portion of the data to be written to the distributed file system is to be written to the first partition;
accessing a metadata repository associated with the data warehouse system;
determining, based on the accessing of the metadata repository, whether a partition-to-cluster mapping entry for the first partition targeted by the write request exists in the metadata repository;
in response to a determination that the partition-to-cluster mapping entry for the first partition exists in the metadata repository:
obtaining, from the partition-to-cluster mapping entry for the first partition, an identifier of a first cluster to which the first partition is assigned by the partition-to-cluster mapping entry for the first partition, the first cluster being one of a plurality of clusters of the distributed file system, each cluster of the plurality of clusters having one name node and a plurality of data nodes, and
using the name node of the first cluster to store the portion of the data belonging to the first partition at one or more data nodes of the plurality of data nodes of the first cluster;
in response to a determination that the partition-to-cluster mapping entry for the first partition does not exist in the metadata repository:
dynamically assigning one cluster from the plurality of clusters to the first partition;
storing a new partition-to-cluster mapping entry in the metadata repository that associates the first partition with the assigned cluster; and
using the name node of the assigned cluster to store the portion of the data belonging to the first partition at one or more data nodes of the plurality of data nodes of the assigned cluster.

2. The computer-implemented method of claim 1, wherein the first partition is a time-based partition.

3. The computer-implemented method of claim 1, further comprising monitoring a utilization level of each of the plurality of clusters.

4. The computer-implemented method of claim 3, wherein the assignment of one cluster from the plurality of clusters to the first partition is based on the monitoring.

5. The computer-implemented method of claim 3, further comprising load balancing the plurality of clusters based on the monitoring.

6. The computer-implemented method of claim 1, further comprising:
receiving a read request to read data from the distributed file system;
based on the receiving the read request to read data from the distributed file system, determining a second partition, associated with the data warehouse system, targeted by the read request to read data;
accessing the metadata repository associated with the data warehouse system to determine whether a partition-to-cluster mapping entry for the second partition targeted by the read request exists in the metadata repository;
in response to a determination that the partition-to-cluster mapping entry for the second partition exists in the metadata repository,
obtaining, from the partition-to-cluster mapping entry for the second partition, an identifier of a second cluster to which the second partition is assigned by the partition-to-cluster mapping entry for the second partition, the second cluster being one of the plurality of clusters of the distributed file system, and
using the name node of the second cluster to access data stored at one or more data nodes of the plurality of data nodes of the second cluster;
in response to a determination that the partition-to-cluster mapping entry for the second partition does not exist in the metadata repository, indicating an error notification.

7. A non-transitory computer-readable storage media storing one or more sequences of program instructions which, when executed by one or more processors, cause the one or more processors to perform:
receiving a query to the distributed file system;
determining a particular partition, associated with the data warehouse system, targeted by the query;
accessing a repository associated with the data warehouse system;
determining, based on the accessing of the metadata repository, whether a partition-to-cluster mapping entry for the particular partition targeted by the query exists in the repository;
wherein the repository does not have a partition-to-cluster mapping entry for one or more partitions;
in response to a determination that the partition-to-cluster mapping entry for the particular partition exists in the repository, obtaining, from the partition-to-cluster mapping entry for the particular partition, an identifier of a particular cluster to which the particular partition is assigned by the partition-to-cluster mapping entry for the particular partition, the particular cluster being one of a plurality of clusters of the distributed file system, each cluster of the plurality of clusters having one name node and a plurality of data nodes, wherein responsive to determining that the partition-to-cluster mapping entry for the one or more partitions does not exist, one cluster from the plurality of clusters is dynamically assigned to the particular partition, a new partition-to-cluster mapping entry is stored in the metadata repository that associates the particular cluster to the one or more partitions, and the name node of the assigned cluster is used to store the portion of the data belonging to the particular partition at one or more data nodes of the plurality of data nodes of the assigned cluster.

8. The non-transitory computer-readable storage media of claim 7, wherein the query is a write query.

9. The non-transitory computer-readable storage media of claim 8, further comprising sequences of program instructions which, when executed by the one or more processors, cause the one or more processors to further perform in response to the determination that the partition-to-cluster mapping entry for the particular partition exists in the repository, storing data belonging to the particular partition at one or more data nodes of the plurality of data nodes of the particular cluster.

10. The non-transitory computer-readable storage media of claim 7, wherein the query is a read query.

11. The non-transitory computer-readable storage media of claim 10, further comprising sequences of program instructions which, when executed by the one or more processors, cause the one or more processors to further perform in response to the determination that the partition-to-cluster mapping entry for the particular partition exists in the repository, using the name node of the particular cluster to access data stored at one or more data nodes of the plurality of data nodes of the particular cluster.

12. The non-transitory computer-readable storage media of claim 10, further comprising sequences of program instructions which, when executed by the one or more processors, cause the one or more processors to further perform in response to a determination that the partition-to-cluster mapping entry for the particular partition does not exist in the repository, indicating an error notification.

13. A system comprising:
  a distributed file system comprising a plurality of clusters, each of the plurality of clusters including one name node and a plurality of data nodes;
  a repository storing partition-to-cluster mapping entries;
  a computing device communicatively coupled to the plurality of clusters and the repository and comprising a non-transitory data storage medium storing a set of instructions which, when executed by the computing device, cause:
  receiving a query to the distributed file system;
  determining a particular partition targeted by the query;
  accessing the repository;
  determining, based on the accessing of the repository, whether a partition-to-cluster mapping entry for the particular partition targeted by the query exists in the repository;
  wherein the repository does not have a partition-to-cluster mapping entry for one or more partitions;
  in response to a determination that the partition-to-cluster mapping entry for the particular partition exists in the repository, obtaining, from the partition-to-cluster mapping entry for the particular partition, an identifier of a particular cluster to which the particular partition is assigned by the partition-to-cluster mapping entry for the particular partition, the particular cluster being one of a plurality of clusters of the distributed file system, each cluster of the plurality of clusters having one name node and a plurality of data nodes, wherein responsive to determining that the partition-to-cluster mapping entry for the one or more partitions does not exist, one cluster from the plurality of clusters is dynamically assigned to the particular partition, a new partition-to-cluster mapping entry is stored in the metadata repository that associates the particular cluster to the one or more partitions, and the name node of the assigned cluster is used to store the portion of the data belonging to the particular partition at one or more data nodes of the plurality of data nodes of the assigned cluster.

14. The system of claim 13, wherein the query is a write query.

15. The system of claim 14, wherein the non-transitory data storage medium storing the set of instructions which, when executed by the computing device, further cause in response to the determination that the partition-to-cluster mapping entry for the particular partition exists in the repository, storing data belonging to the particular partition at one or more data nodes of the plurality of data nodes of the particular cluster.

16. The system of claim 13, wherein the query is a read query.

17. The system of claim 16, wherein the non-transitory data storage medium storing the set of instructions which, when executed by the computing device, further cause using the name node of the particular cluster to access data stored at one or more data nodes of the plurality of data nodes of the particular cluster.

18. The system of claim 16, wherein the non-transitory data storage medium storing the set of instructions which, when executed by the computing device, further cause in response to a determination that the partition-to-cluster mapping entry for the particular partition does not exist in the repository, indicating an error notification.

* * * * *